United States Patent
Lee et al.

(10) Patent No.: US 10,718,248 B2
(45) Date of Patent: Jul. 21, 2020

(54) EXHAUST GAS PURIFICATION SYSTEM AND THE CONTROL METHOD THEREOF

(71) Applicants: HYUNDAI MOTOR COMPANY, Seoul (KR); KIA MOTORS CORPORATION, Seoul (KR); FEV Europe GmbH, Aachen (DE)

(72) Inventors: Myung Jong Lee, Suwon-Si (KR); Jin Woo Park, Seoul (KR); Ki Hyung Joo, Yongin-Si (KR); Waldemar Josef Kansy, Dusseldorf (DE); Arun Palaniappan Muthukaruppan, Aachen (DE)

(73) Assignees: HYUNDAI MOTOR COMPANY, Seoul (KR); KIA MOTORS CORPORATION, Seoul (KR); FEV EUROPE GMBH, Aachen (DE)

( * ) Notice: Subject to any disclaimer, the term of this patent is extended or adjusted under 35 U.S.C. 154(b) by 0 days.

(21) Appl. No.: 16/204,845

(22) Filed: Nov. 29, 2018

(65) Prior Publication Data

US 2019/0360378 A1    Nov. 28, 2019

(30) Foreign Application Priority Data

May 24, 2018    (KR) .................. 10-2018-0058972

(51) Int. Cl.
*F01N 3/20*    (2006.01)
*F01N 3/035*    (2006.01)
*F01N 3/10*    (2006.01)

(52) U.S. Cl.
CPC ............. *F01N 3/208* (2013.01); *F01N 3/035* (2013.01); *F01N 3/106* (2013.01);
(Continued)

(58) Field of Classification Search
CPC ...... F01N 3/0222; F01N 3/035; F01N 3/2066; F01N 3/208; F01N 9/005; F01N 2330/60; F01N 2560/026; F01N 2560/06; F01N 2610/02; F01N 2900/0416; F01N 2900/1404; F01N 2900/1602;
(Continued)

(56) References Cited

U.S. PATENT DOCUMENTS

| 8,474,248 B2 | 7/2013 | Sun et al. |
| 2004/0098981 A1* | 5/2004 | Crawley ................. F01N 3/025 60/297 |

(Continued)

FOREIGN PATENT DOCUMENTS

| JP | 2006-022729 A | 1/2006 |
| JP | 2015-194120 A | 11/2015 |

*Primary Examiner* — Brandon D Lee
(74) *Attorney, Agent, or Firm* — Morgan, Lewis & Bockius LLP

(57) ABSTRACT

An exhaust gas purification system, which includes an engine and an exhaust pipe that is connected to an exhaust manifold of the engine, includes: a catalyst converter disposed at a rear side the engine on the exhaust pipe; a selective catalytic reduction on diesel particulate filter (SDPF) disposed at a rear side of the catalyst converter on the exhaust pipe; a reducing agent injector disposed between the catalyst converter and the SDPF on the exhaust pipe and injecting a reducing agent; and a controller controlling an amount of the reducing agent injected from the reducing agent injector.

5 Claims, 6 Drawing Sheets

(52) U.S. Cl.
CPC .... *F01N 2560/026* (2013.01); *F01N 2560/06* (2013.01); *F01N 2610/02* (2013.01); *F01N 2900/0416* (2013.01); *F01N 2900/1404* (2013.01); *F01N 2900/1616* (2013.01)

(58) Field of Classification Search
CPC ..... F01N 2900/1616; F01N 2900/1621; F01N 2900/1812; F01N 3/106
See application file for complete search history.

(56) References Cited

U.S. PATENT DOCUMENTS

| | | | |
|---|---|---|---|
| 2005/0282285 A1* | 12/2005 | Radhamohan | B01D 53/90 436/55 |
| 2010/0122524 A1* | 5/2010 | Solbrig | F01N 3/103 60/285 |
| 2014/0283502 A1* | 9/2014 | Argolini | F02D 41/0245 60/274 |
| 2015/0096287 A1* | 4/2015 | Qi | F01N 3/208 60/286 |
| 2015/0113951 A1* | 4/2015 | Larose, Jr. | F01N 3/18 60/274 |

* cited by examiner

EXHAUST GAS PURIFICATION SYSTEM AND THE CONTROL METHOD THEREOF

CROSS-REFERENCE TO RELATED APPLICATION

This application claims priority to and the benefit of Korean Patent Application No. 10-2018-0058972 filed in the Korean Intellectual Property Office on May 24, 2018, the entire contents of which are incorporated herein by reference.

TECHNICAL FIELD

The present disclosure relates to an exhaust gas purification system having a selective catalytic reduction catalyst on diesel particulate filter (SDPF) and a control method thereof.

BACKGROUND

Selective Catalytic Reduction (SCR) catalyst is a type of catalytic converter which purifies NOx contained in exhaust gas. When reducing agents such as urea, ammonia, carbon monoxide, and hydrocarbons (HC) are supplied to the exhaust gas, the NOx contained in the exhaust gas is reduced by the SCR catalyst through an oxidation-reduction reaction with the reducing agents.

When a lean NOx trap (LNT) and the SCR catalyst are used together, the SCR catalyst may be coated on a diesel particulate filter due to space restriction. A selective catalytic reduction catalyst on diesel particulate filter (SDPF) absorbs particulate matter contained the exhaust gas and eliminates NOx contained in the exhaust gas.

Generally, an NOx sensor is installed at a front end and a rear end of the SCR for measuring NOx purification efficiency of an SCR system. Difference between values measured at the front end and the rear end of the SCR is amount of NOx purification, and means efficiency of the SCR system. However, this NOx sensor installed at the vehicle also responds to NH3, and detects NH3 as NOx.

The NH3 is sufficiently supplied to a part of section of the SCR system, and the NH3 is insufficiently supplied to the remains. In a section where the NH3 is sufficiently supplied, the NH3 is absorbed and slipped when it becomes over absorption capacity. If a urea injection is stopped to decrease NH3 slip in the section where the NH3 is sufficiently supplied, NOx purification in a section where the NH3 is insufficiently supplied is prevented, thereby amount of NOx exhaust of a tail pipe increases.

When the NH3 slip is generated in the part of the section of the SCR, the NOx sensor at the rear end of the SCR misrecognizes the slipped NH3 as unpurified NOx to feedback control so as to increase the amount of urea supply. In this case, the NH3 slip increases continuously, and NOx purification efficiency measured by the NOx sensors of the front and rear ends of the SCR becomes deteriorated. Accordingly, it is impossible to control correction of a urea injection and monitor an efficiency of the SCR. In other words, although the SCR still maintains a good purification efficiency, but a purification efficiency measured using an NOx sensor may be calculated to be deteriorated. Accordingly, in view of OBD (On-Board Diagnotics; exhaust gas self diagnosis), a normal SCR may be diagnosed as a deficient SCR.

Particularly, when an NH3 is detected during an overrun, detection range is limited and detection in various driving conditions is not accurate. Further, contributiveness of NOx and NH3 may not be recognized in the NOx purification efficiency.

Further, it is not recognized whether the SCR system calculating the NOx purification efficiency to be low is really out of order to have a low NOx purification performance or the NOx purification performance is maintained to be good but a distortion of a sensor value is happened by an NH3 slip.

Accordingly, a normal component may be diagnosed as a disabled component because an influence degree of an NOx purification efficiency by an NH3 slip is not determined, and in this case, the entire SCR components has to be changed to make a generated cost high.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide an exhaust gas purification system and a control method thereof capable of detecting NH3 slip in a real time using an NOx sensor value of a rear end of the SDPF and a model value, adjusting amount of urea injection, and improving reliability of OBD diagnosis in various driving conditions that the NH3 slip is generated.

An exhaust gas purification system, which includes an engine and an exhaust pipe that is connected to an exhaust manifold of the engine, according to an exemplary embodiment of the present disclosure includes: a catalytic converter disposed at a rear side of the engine on the exhaust pipe; a selective catalytic reduction on diesel particulate filter (SDPF) disposed at a rear side of the catalytic converter on the exhaust pipe, a reducing agent injector disposed between the catalytic converter and the SDPF on the exhaust pipe and injecting a reducing agent, and a controller controlling an amount of the reducing agent injected from the reducing agent injector, wherein the controller calculates an amount of an ammonia slip, and decreases the amount of the reducing agent injection if a temperature change of the inside the SDPF per unit time is larger than a reference value and a first amount of NOx measured by a first sensor at a rear end of the SDPF is larger than a model NOx value and increases the amount of the reducing agent injection if the first amount of NOx is smaller than the model NOx value. The SDPF may include one or more slices along exhaust gas flow, and each of the one or more slices may have one or more cells having the same cross-section with each other.

The controller may perform a malfunction diagnosis when an NOx purification efficiency is larger than a critical NOx purification efficiency.

The NOx purification efficiency may be calculated by a ratio of a value subtracted the first amount of NOx from a second amount of NOx measured by a second sensor at a front end of the SDPF divided by the second amount of NOx.

The first amount of NOx may be calculated by adding the model NOx value and a value multiplied by the amount of the ammonia slip with a ratio of recognizing the NH3 as the NOx in the NOx sensor.

The controller may calculate a value subtracted the NOx purification efficiency after subtracting the critical NOx purification efficiency from the model NOx purification efficiency, and perform the malfunction diagnosis if the critical NOx purification efficiency is larger than the value obtained by subtracting the NOx purification efficiency from the multiplied value of the ratio of recognizing the NH3 as the NOx in the NOx sensor and the amount of the NH3 slip of the rear end of the SDPF.

The exhaust gas purification system may further include a selective catalytic reduction (SCR) catalytic converter reducing the NOx included in the exhaust gas using an NH3 slipped from the SDPF at the exhaust pipe of the rear end of the SDPF.

The catalytic converter may include a lean NOx trap (LNT) catalyst.

The catalytic converter may include a diesel oxidation catalyst (DOC).

According to an exemplary embodiment of the present disclosure, NH3 may be decreased during driving and NOx purification efficiency may be maintained to be optimal by detecting NH3 slip of the SDPF and optimizing amount of urea injection.

Further, it may be prevented from measuring wrong slipped NH3 to be NOx by an NOx sensor and amount of slipped NOx and NH3 at the rear end of the SDPF may be calculated and expected.

Further, influence of NOx purification efficiency by NH3 slip may be determined in a real time, thereby reliability of OBD diagnosis in various driving conditions that an NH3 slip is generated may be improved.

DETAILED DESCRIPTION OF THE EMBODIMENTS

Figure 1:
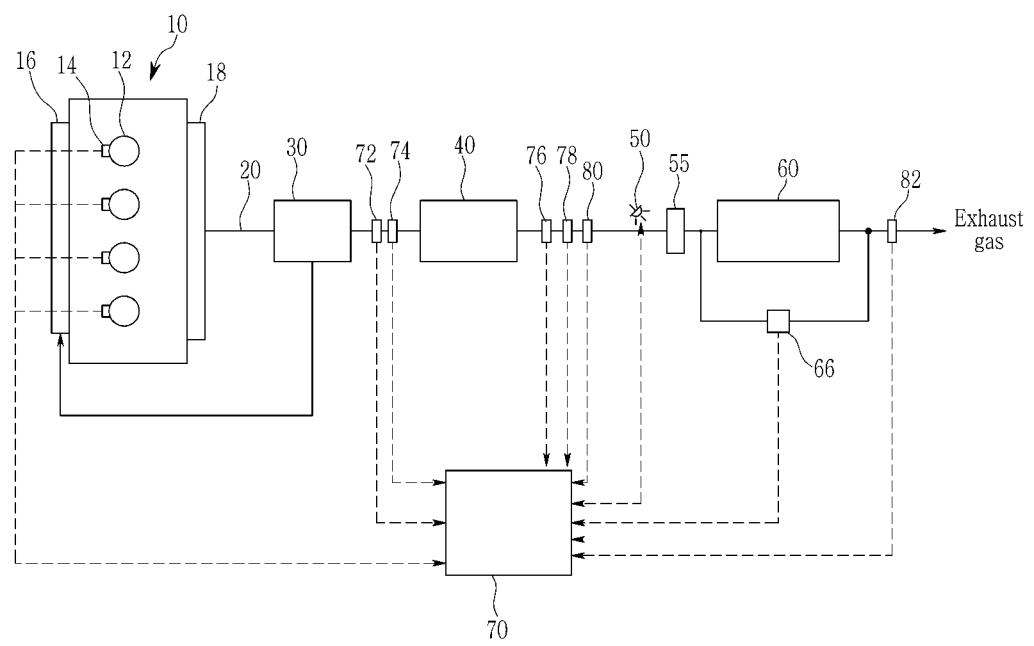
FIG. 1 is a schematic view of an exhaust gas purification system according to an exemplary embodiment of the present disclosure.

Hereinafter, an exemplary embodiment of the present disclosure will be described in detail with reference to the accompanying drawings.

The sizes and thicknesses of the configurations shown in the drawings are provided selectively for the convenience of description, such that the present disclosure is not limited to those shown in the drawings and the thicknesses are exaggerated to make some parts and regions clear.

The parts that are not related to the description of the exemplary embodiments are not shown to make the description clear and like reference numerals designate like element throughout the specification.

Using the terms of the first and the second etc. is for discriminating the components having the same name and they are not limited to the order.

FIG. 1 is a schematic view of an exhaust gas purification system according to an exemplary embodiment of the present disclosure.

As shown in FIG. 1, an exhaust gas purification system for an internal combustion engine includes an engine 10, an exhaust pipe 20, an exhaust gas recirculation (EGR) device 30, a lean NOx trap (LNT) 40, a reducing agent injector 50, a selective catalytic reduction catalyst on diesel particulate filter (SDPF) 60, and a controller 70. Here, the controller 70 may be an electronic control unit (ECU).

The engine 10 burns air/fuel mixture in which fuel and air are mixed so as to convert chemical energy into mechanical energy. The engine 10 is connected to an intake manifold 16 so as to receive the air in a combustion chamber, and is connected to an exhaust manifold 18 such that exhaust gas generated in combustion process is gathered in the exhaust manifold 18 and is exhausted to the exterior. An injector 14 is mounted in the combustion chamber so as to inject the fuel into the combustion chamber.

Herein, a diesel engine is exemplified, but a lean burn gasoline engine may also be used. When the gasoline engine is used, the mixture is introduced into the combustion chamber 12 through the intake manifold 16, and an ignition plug (not illustrated) for ignition is installed on the combustion chamber 12. Further, in the case of using a gasoline direct injection (GDI) engine, the injector 14 is installed on the combustion chamber 12, like a diesel engine.

The exhaust pipe 20 is connected to the exhaust manifold 18 to discharge the exhaust gas to the outside of the vehicle. The LNT 40, the reducing agent injector 50, and the SDPF 60 are installed on the exhaust pipe 20 to remove hydrocarbon, carbon monoxide, particulate matters, and nitrogen oxide included in the exhaust gas.

The EGR device 30 is installed on the exhaust pipe 20 to re-supply a part of the exhaust gas discharged from the engine 10 to the engine 10 through the EGR device 30. Further, the EGR device 30 is connected to the intake manifold 16 to control a combustion temperature by mixing a part of the exhaust gas with the air. This control of the combustion temperature is performed by controlling an amount of exhaust gas supplied to the intake manifold 16 under the control of the controller 70. Accordingly, a recirculation valve (not illustrated) controlled by the controller 70 may be installed on a line connecting the EGR device 30 and the intake manifold 16.

A first oxygen sensor 72 is installed on the exhaust pipe 20 at a rear side of the EGR device 30 to detect an amount of oxygen in the exhaust gas passing through the EGR device 30 and to transmit the detected oxygen amount to the controller 70, thereby allowing the controller 70 to help in performing a lean/rich control of the exhaust gas. In the present specification, a measured value of the first oxygen sensor 72 is referred to as an air-fuel ratio of the front end of the LNT.

Further, a first temperature sensor 74 is installed on the exhaust pipe 20 at the rear side of the EGR device 30 to detect a temperature of the exhaust gas that passes through the EGR device 30.

The LNT 40 is installed on the rear side of exhaust pipe 20 of the EGR device 30. The LNT 40 adsorbs nitrogen oxide (NOx) included in the exhaust gas in a lean atmosphere, desorbs the nitrogen oxide adsorbed in a rich atmosphere, and reduces the nitrogen oxide included in the exhaust gas or the desorbed nitrogen oxide. Further, the LNT 40 oxidizes carbon monoxide (CO) and hydrocarbon (HC) included in the exhaust gas.

Herein, it should be understood that the hydrocarbon refer to all compounds consisting of carbon and hydrogen included in the exhaust gas and the fuel. Further, the LNT 40 is explained as an example of the first catalyst, however the first catalyst may be a diesel oxidation catalyst (DOC).

A second oxygen sensor 76, a second temperature sensor 78 and a first NOx sensor 80 are installed on the rear exhaust pipe 20 of the LNT 40.

The second oxygen sensor 76 measures the amount of oxygen contained in the exhaust gas introduced into the SDPF 60 to transmit a signal of the measured amount of oxygen to the controller 70. On the basis of detecting values of the first oxygen sensor 72 and the second oxygen sensor 76, the controller 70 may perform lean/rich control. In the present specification, a measured value of the second oxygen sensor 76 is referred to as an air-fuel ratio of the front end of the filter.

The second temperature sensor 78 measures a temperature of the exhaust gas introduced into the SDPF 60 to transmit a signal of the measured temperature to the controller 70. Here, a third temperature sensor 90 detecting temperature of the exhaust gas exhausting from the SDPF 60 to transmit a signal of the detected temperature to the controller 70 may further disposed. The first NOx sensor 80 measures an amount of NOx included in the exhaust gas introduced into the SDPF 60 to transmit a signal of the measured amount to the controller 70. The amount of NOx measured by the first NOx sensor 80 may be used to determine the amount of reducing agent to be injected by the reducing agent injector 50.

The reducing agent injector 50 is installed in the front exhaust pipe 20 of the SDPF 60 and controlled by the controller 70 to inject the reducing agent to the exhaust gas. Typically, the reducing agent injector 50 injects urea, and the injected urea is converted into ammonia by hydrolysis.

However, the reducing agent is not limited to the ammonia. Hereinafter, for convenience of explanation, ammonia is used as the reducing agent, and the reducing agent injector 50 injects the urea. However, within the spirit and scope of the appended claims, it is to be understood that using reducing agent except the ammonia is included in the scope of the present disclosure.

A mixer 55 may be installed on the rear exhaust pipe 20 of the reducing agent injector 50 to uniformly mix the reducing agent with the exhaust gas.

The SDPF 60 is installed on the rear exhaust pipe 20 of the mixer 55 to collect particulate matters included in the exhaust gas and reduce nitrogen oxide included in the exhaust gas using the reducing agent injected by the reducing agent injector 50.

Figure 3:
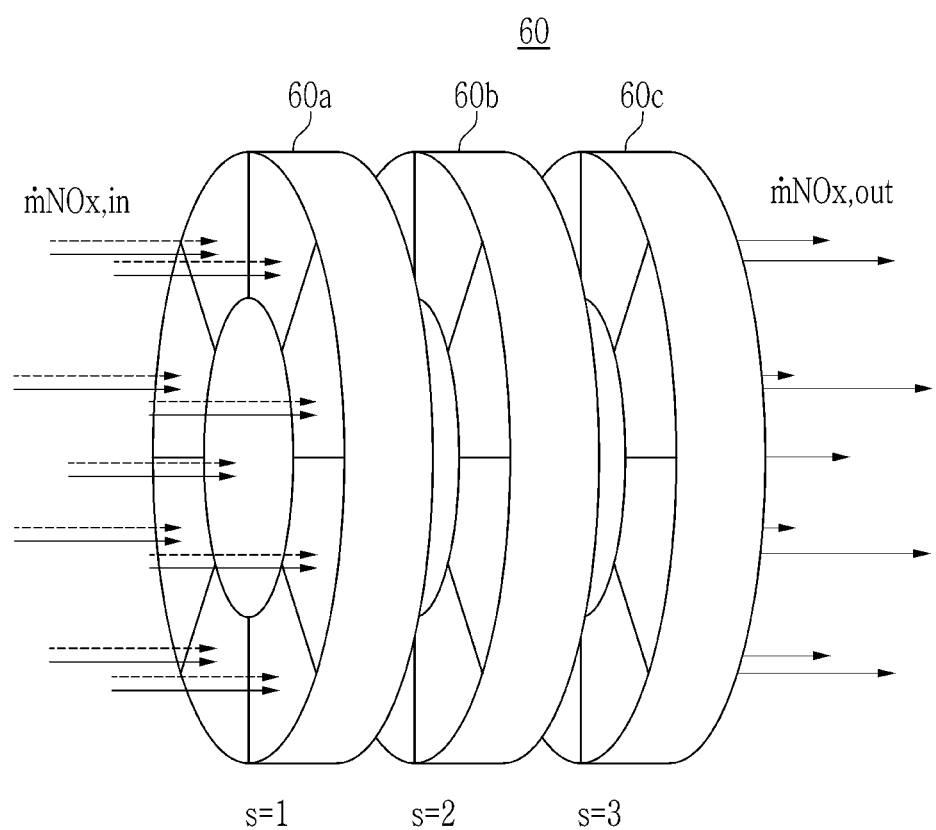
FIG. 3 is a perspective view schematically illustrating an SDPF used in an exemplary embodiment of the present disclosure.
Figure 4:
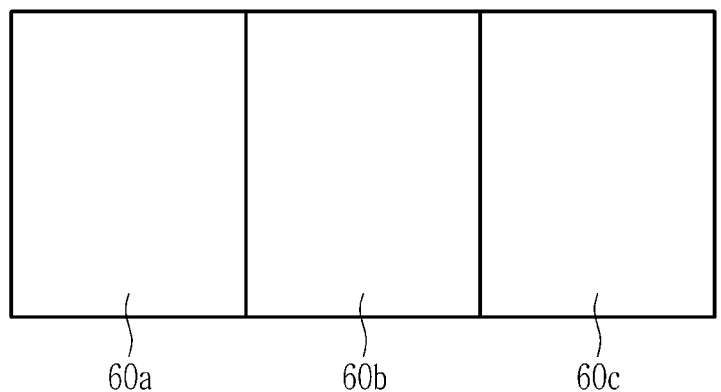
FIG. 4 is a side cross-sectional view schematically illustrating an SDPF used in an exemplary embodiment of the present disclosure.
Figure 5:
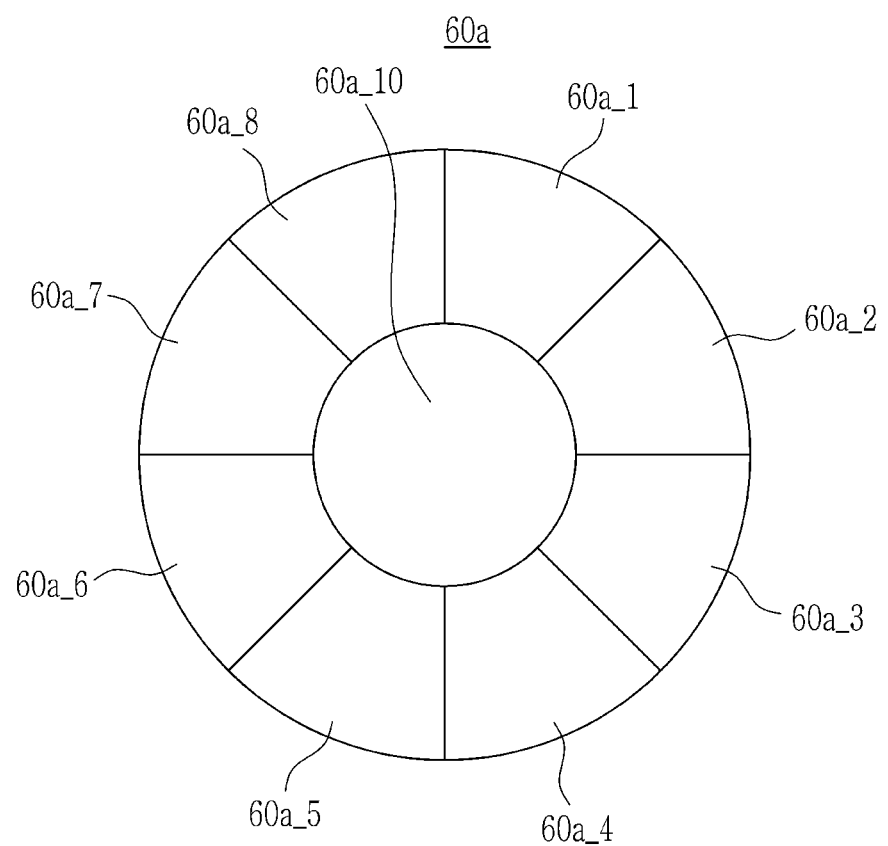
FIG. 5 is a front cross-sectional view illustrating one example of cells used in an exemplary embodiment of the present disclosure.

As illustrated in FIG. 3 to FIG. 5, the SDPF 60 may include one or more slices 60*a*, 60*b* and 60*c* along exhaust gas flow, and each of the slices 60*a*, 60*b* and 60*c* has one or more cells having shapes set to have same cross-section with each other. For example, one slice 60*a* may include a plurality of cell 60*a*_1 to 60*a*_10.

The controller 70 recognized the SDPF 60 into a plurality of slices to calculate injection amount of the reducing agent. That is, the plurality of slices of the SDPF 60 are arranged in sequence along the flow of the exhaust gas and may be divided physically or virtually. The lengths of the respective slices are the same as each other, accordingly, a memory capacity, a calculation time, and the like may be minimized.

Further, the controller 70 divides and recognizes each slice into a plurality of cells. The number of cells constituting each slice may be determined by a designer by considering accuracy of the calculation, a memory capacity, and a calculation time. Further, the n-th cell of one slice is located at the same position as the n-th cell of the other slice in radial and circumferential directions and the shapes thereof are also the same as each other. Furthermore, the areas of the cells are the same as each other. As illustrated in FIG. 5, each cell has a fan shape and a central angle thereof is the same. Circular cells may be located at the center and the cells of the fan-shaped pieces (cutting the circular cell portion) having the same central angle are located around the circular cells. The areas of the respective cells are the same as each other and the position and shape of the n-th cell in each slice are the same, thereby minimizing the capacity of the memory and the calculation time.

In each cell, physical/chemical characteristics such as the concentration of nitrogen oxides, the concentration of ammonia, and the temperature are the same. Further, it is also assumed that the exhaust gas, the NOx, the ammonia, and the like are not movable between the cells constituting each slice.

The number of slices, the shape of the slice, the number of cells, and the shape of the cell are not limited to those exemplified herein, and may be set by the designer in consideration of the accuracy of model calculation.

An additional SCR catalyst reducing the NOx included in the exhaust gas using an NH3 slipped from the SDPF 60 may be further provided at the exhaust pipe 20 of the rear end of the SDPF 60. The additional SCR catalyst may further purify the NOx if the SDPF 60 does not perfectly purify the NOx. The additional SCR catalyst may be provided separately from the SDPF 60.

A differential pressure sensor 66 is installed on the exhaust pipe 20. The differential pressure sensor 66 measures a difference in pressure between the front end and the rear end of the SDPF 60 and transmits a signal for the measured difference to the controller 70. The controller 70 may control the SDPF 60 to be reproduced when the pressure difference measured by the differential pressure sensor 66 is equal to or higher than a set pressure.

In this case, the particulate matters collected in the SDPF 60 may be burned by post-injecting the fuel by the injector 14.

Further, a second NOx sensor 82 is installed on the rear exhaust pipe 20 of the SDPF 60. The second NOx sensor 82 detects an amount of nitrogen oxide included in the exhaust gas discharged from the SDPF 60 and transmits a signal for the measured amount to the controller 70. The controller 70 may monitor whether the SDPF 60 normally removes the nitrogen oxide included in the exhaust gas based on the detection value of the second NOx sensor 82. That is, the second NOx sensor 82 may be used to evaluate the performance of the SDPF 60.

The controller 70 determines an operating condition of the engine based on the signals detected by the sensors and controls the lean/rich control and the amount of reducing agent injected by the reducing agent injector 50 based on the operating condition of the engine.

For example, the controller 70 controls the air-fuel ratio to the rich atmosphere so as to remove nitrogen oxide from the LNT 40 (in the present specification, referred to as 'regeneration of LNT') and remove nitrogen oxide from the SDPF 60 through the injection of the reducing agent. The lean/rich control may be performed by adjusting the amount of fuel injected by the injector 14 and an injection timing.

The controller 70 calculates internal temperature of the SDPF 60, amount of ammonia absorbed in the SDPF 60, and exhaust amount of NOx of the rear end of the LNT 40 on the basis of the engine driving conditions, and expect NOx purification efficiency of the SDPF 60.

For this purpose, the controller 70 stores characteristics of absorption and oxidation of ammonia according to an internal temperature of the SDPF 60, characteristics of desorption of ammonia according to internal temperature of the SDPF 60, and characteristics of NOx slip of the LNT in a rich atmosphere.

The characteristics of absorption and oxidation of ammonia according to the internal temperature of the SDPF 60, characteristics of desorption of ammonia according to internal temperature of the SDPF 60, and characteristics of NOx slip of the LNT in a rich atmosphere etc. may be defined as maps by many experiments. Further, the controller 70 performs the regeneration of the SDPF 60 and the desulfurization of the LNT 40.

For this purpose, the controller 70 may be implemented by one or more processors that are operated by a set program, and the set program may be programmed to perform each step of the method of controlling the exhaust gas purification system according to the exemplary embodiment of the present disclosure.

Figure 2:
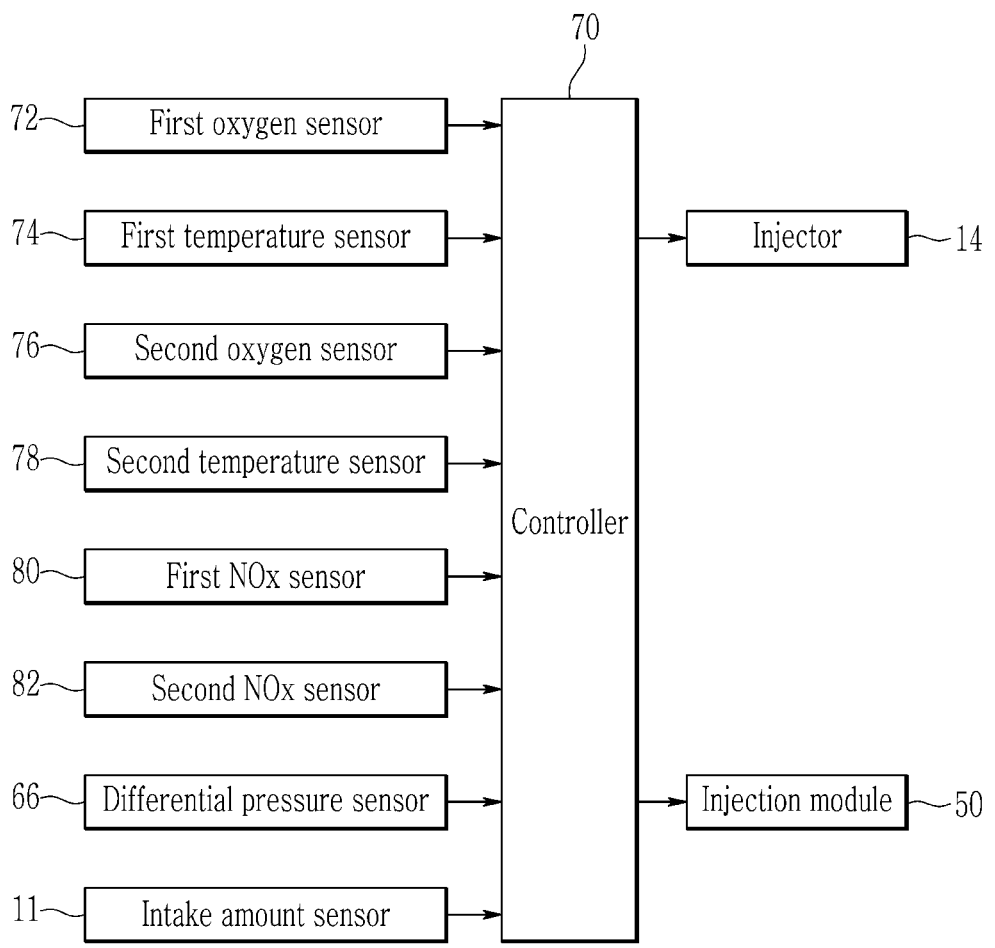
FIG. 2 is a block diagram illustrating relation of input and output of a controller in the exhaust gas purification system according to an exemplary embodiment of the present disclosure.

FIG. 2 is a block diagram illustrating relation of input and output of a controller in the exhaust gas purification system according to an exemplary embodiment of the present disclosure.

As illustrated in FIG. 2, the first oxygen sensor 72, the first temperature sensor 74, the second oxygen sensor 76, the second temperature sensor 78, the first NOx sensor 80, the second NOx sensor 82, the third temperature sensor 90, the differential pressure sensor 66, and an intake amount sensor may be electrically connected to the controller 70 and transmit the detected values to the controller 70.

The first oxygen sensor 72 detects an amount of oxygen in the exhaust gas passing through the EGR device 30 to transmit a signal for the amount to the controller 70. The controller 70 may help in performing a lean/rich control of the exhaust gas based on the amount of oxygen in the exhaust gas detected by the first oxygen sensor 72. The value detected by the first oxygen sensor 72 may be represented by a lambda. The lambda represents a ratio of an actual air-fuel ratio to a theoretical air-fuel ratio, and if the lambda is more than 1, the atmosphere is lean and if the lambda is less than 1, the atmosphere is rich.

The first temperature sensor 74 detects a temperature of the exhaust gas passing through the EGR device 30 to transmit a signal of the detected temperature to the controller 70.

The second oxygen sensor 76 measures an amount of oxygen included in the exhaust gas discharged from the SDPF 60 to transmit a signal for the measured amount to the controller 70.

The second temperature sensor 78 measures a temperature of the exhaust gas introduced into the SDPF 60 to transmit a signal for the measured temperature to the controller 70.

The first NOx sensor 80 measures an amount of NOx included in the exhaust gas introduced into the SDPF 60 to transmit a signal for the measured amount to the controller 70.

The second NOx sensor 82 detects an amount of nitrogen oxide included in the exhaust gas discharged from the SDPF 60 to transmit a signal for the detected amount to the controller 70.

The differential pressure sensor 66 measures a difference in pressure between the front end and the rear end of the SDPF 60 to transmit a signal for the measured difference to the controller 70, and the third temperature sensor 90 measures a temperature of the exhaust gas exhausted from the SDPF 60 to transmit a signal for the measured temperature to the controller 70.

The controller 70 determines an engine operating condition, a fuel injection amount, a fuel injection timing, a fuel injection pattern, a reduction injection amount, a regeneration timing of the SDPF 60, and a regeneration/desulfurization timing of the LNT 40 based on the transmitted values and outputs signals for controlling the injector 14 and the reducing agent injector 50 to the injector 14 and the reducing agent injector 50.

In the exhaust gas purification system according to the exemplary embodiment of the present disclosure, a plurality of sensors may be installed in addition to the sensors shown in FIG. 2, but will be omitted for the convenience of description.

Figure 6:
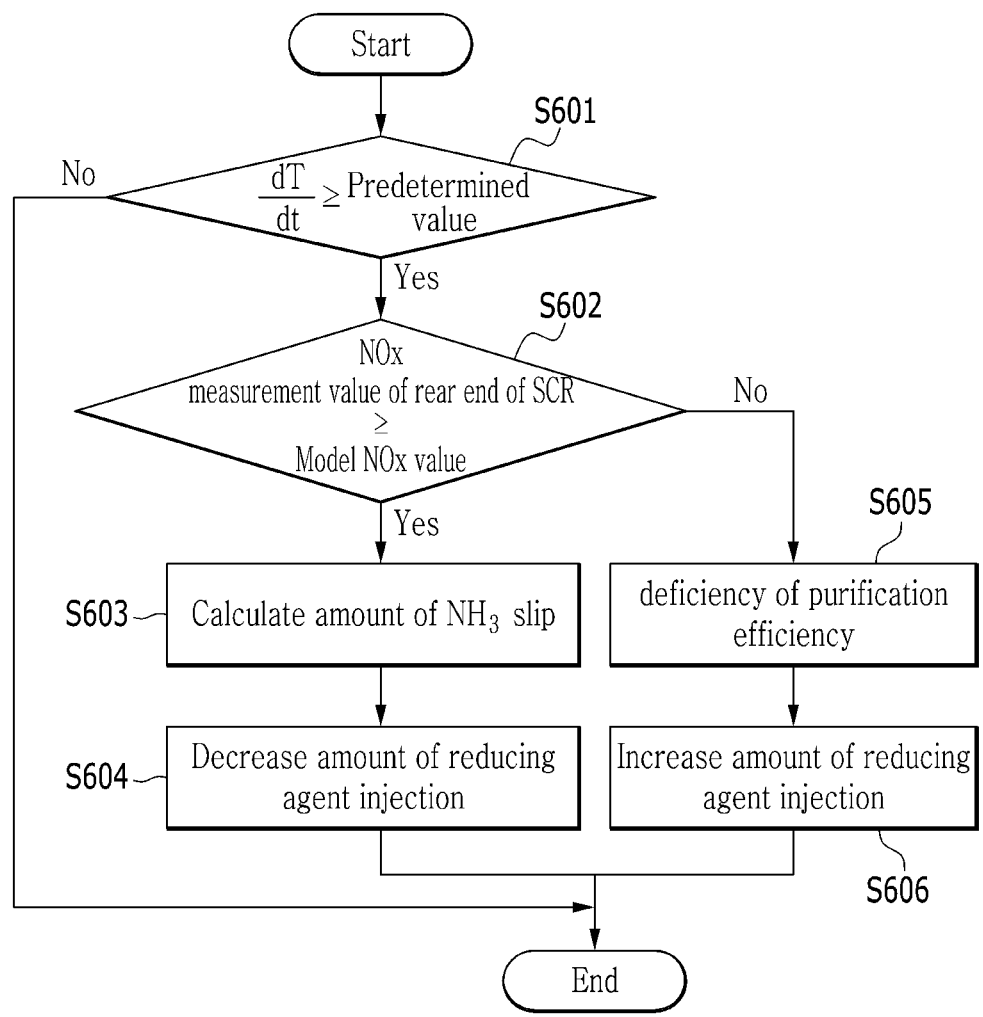
FIG. 6 is a flowchart illustrating a method adjusting amount of reducing agent injection in an exhaust gas purification system according to an exemplary embodiment of the present disclosure.

FIG. 6 is a flowchart illustrating a method adjusting amount of reducing agent injection in an exhaust gas purification system according to an exemplary embodiment of the present disclosure.

Referring to FIG. 6, when the engine 10 starts, the controller 70 starts controlling.

Firstly, the controller 70 calculates an internal temperature of the SDPF 60. The controller 70 may calculate the internal temperature of the SDPF according to driving information. Here, the driving information may include an engine revolutions per minute (RPM), a fuel injection amount, an outside temperature or a coolant temperature.

The controller 70 calculates a temperature change (dT/dt) per unit time of inside the SDPF 60, and determines whether the temperature change (dT/dt) per unit time of inside the SDPF 60 is larger than a first predetermined value or not (S601). Here, the first predetermined value may be about 10° C.

Then, if the temperature change (dT/dt) per unit time of inside the SDPF 60 is larger than the first predetermined value, the controller 70 determines whether an NOx measurement value of the rear end of the SDPF 60 is larger than a model NOx value or not (S602).

Then, if the NOx measurement value of the rear end of the SDPF 60 is larger than the model NOx value, the controller 70 calculates an amount of NH3 (S603) and decreases the amount of the reducing agent injection (S604).

If the NOx measurement value of the rear end of the SDPF 60 is not larger than the model NOx value, the controller 70 determines deficiency of purification efficiency (S605) and increases the amount of the reducing agent injection (S606).

The controller 70 performs a malfunction diagnosis when an NOx purification efficiency of the SDPF 60 is larger than a critical NOx purification efficiency ($\eta_{threshold}$). Here, the malfunction diagnosis is to determine that the SDPF has failed.

The NOx purification efficiency of the SDPF is calculated by a ratio of a value subtracted the NOx measurement value of the rear end of the SDPF ($NO_{xDsmeas}$) from the NOx measurement value of the front end of the SDPF ($NO_{xUsmeas}$) divided by the NOx measurement value of the front end of the SDPF ($NO_{xUsmeas}$). The malfunction diagnosis condition may be expressed as an equation (1).

$$\frac{NO_{xUs\ meas} - NO_{xDs\ meas}}{NO_{xUs\ meas}} > \eta_{threshold} \qquad \text{equation (1)}$$

Further, the NOx measurement value of the rear end of the SDPF ($NO_{xDsmeas}$) is calculated by adding the model NOx value of the rear end of the SDPF ($NO_{xDsmodel}$) and a value multiplied by the amount of an ammonia slip ($NH_{3slip}$) with a ratio of recognizing the NH3 as the NOx in the NOx sensor ($\chi$).

Accordingly, the equation (1) may be expressed as an equation (2).

$$\frac{NO_{xUs\ meas} - (NO_{xDs\ model} + \chi * NH_{3slip})}{NO_{xUs\ meas}} > \eta_{threshold} \qquad \text{equation (2)}$$

Further, the equation (2) may be expressed as an equation (3). At this time, the model NOx purification efficiency ($\eta_{model}$) is a value subtracted the model NOx value of the rear end of the SDPF ($NO_{xDsmodel}$) from the NOx measurement value of the front end of the SDPF ($NO_{xUsmeas}$) divided by the NOx measurement value of the front end of the SDPF ($NO_{xUsmeas}$).

$$\eta_{model} - \frac{\chi * NH_{3slip}}{NO_{xUs\ meas}} > \eta_{threshold} \qquad \text{equation (3)}$$

Further, the equation (3) may be expressed as an equation (4).

$$\eta_{model} - \eta_{threshold} > \frac{\chi * NH_{3slip}}{NO_{xUs\ meas}} \qquad \text{equation (4)}$$

The controller 70 calculates a value subtracted a malfunction diagnosis critical NOx purification efficiency ($\eta_{threshold}$) and then subtracted an NOx purification efficiency by a sensor offset ($\eta_{offset}$) from the model NOx purification efficiency ($\eta_{model}$) as a limit NOx purification efficiency ($\eta_{limit}$). This is expressed as an equation (5).

$$\eta_{limit} = \eta_{model} - \eta_{threshold} - \eta_{offset} \qquad \text{equation (5)}$$

It may be expressed as an equation (6) by substituting the equation (5) to the equation (4).

$$\eta_{limit} > \frac{\chi * NH_{3slip}}{NO_{xUs\ meas}} - \eta_{offset} \qquad \text{equation (6)}$$

When the equation (6) is satisfied, that is, the limit NOx purification efficiency ($\eta_{limit}$) is larger than a value that subtracted the NOx purification efficiency by a sensor offset ($\eta_{offset}$) from a value multiplied by the amount of an ammonia slip ($NH_{3slip}$) with a ratio of recognizing the NH3 as the NOx in the NOx sensor ($\chi$) divided by the NOx sensor measurement value of the front end of the SDPF, the controller may perform the malfunction diagnosis. If the equation (6) is not satisfied, the malfunction diagnosis stops.

According to the exemplary embodiments of the present disclosure, NH3 may be decreased during driving and NOx purification efficiency may be maintained to be optimal by detecting NH3 slip of the SDPF and by optimizing the amount of urea injection.

Further, it is possible to prevent measurement of wrong slipped NH3 to be NOx by an NOx sensor, and amount of slipped NOx and NH3 at the rear end of the SDPF can be calculated and expected.

Further, influence of NOx purification efficiency by NH3 slip may be determined in a real time, thereby reliability of OBD diagnosis in various driving conditions that an NH3 slip is generated may be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An exhaust gas purification system, which includes an engine and an exhaust pipe that is connected to an exhaust manifold of the engine, comprising:
   a catalytic converter disposed at a rear side of the engine on the exhaust pipe;
   a selective catalytic reduction on diesel particulate filter (SDPF) disposed at a rear side of the catalytic converter on the exhaust pipe;
   a reducing agent injector disposed between the catalytic converter and the SDPF on the exhaust pipe, the reducing agent injector injecting a reducing agent; and
   a controller configured to instruct the reducing agent injector to control an amount of the reducing agent wherein the controller is further configured to calculate an amount of an ammonia slip, and wherein the controller is further configured to decrease the amount of the reducing agent injection if a temperature change of an inside the SDPF per unit time is larger than a reference value and a first amount of NOx measured by a first sensor at a rear end of the SDPF is larger than a model NOx value, and to increase the amount of the reducing agent injection if the first amount of NOx is smaller than the model NOx value,
   wherein the controller preforms a malfunction diagnosis when an NOx purification efficiency of the SDPF is larger than a critical NOx purification efficiency,
   the NOx purification efficiency of the SDPF is calculated by a ratio of a value subtracted the first amount of NOx from a second amount of NOx measured by a second sensor at a front end of the SDPF divided by the second amount of NOx,
   the first amount of NOx is calculated by adding the model NOx value of the rear end of the SDPF and a value multiplied by the amount of the ammonia slip with a ratio of recognizing the NH3 as the NOx in the NOx sensor, and
   the controller calculates a value by subtracting the NOx purification efficiency of the SDPF after subtracting the critical NOx purification efficiency from the model NOx purification efficiency, and the controller performs the malfunction diagnosis if the critical NOx purification efficiency is larger than a value obtained by subtracting the NOx purification efficiency from a multiplied value of the ratio of recognizing the $NH_3$ as the NOx in the NOx sensor and the amount of the $NH_3$ slip of the rear end of the SDPF.

2. The exhaust gas purification system of claim 1, wherein: the SDPF includes one or more slices in an exhaust gas flow direction, and each of the one or more slices has one or more cells having the same cross-section with each other.

3. The exhaust gas purification system of, further comprising:
  a selective catalytic reduction (SCR) catalytic converter for reducing the NOx included in the exhaust gas using an NH3 slipped from the SDPF on the exhaust pipe at the rear end of the SDPF.

4. The exhaust gas purification system of claim 1, wherein:
  the catalytic converter includes a lean NOx trap (LNT) catalyst.

5. The exhaust gas purification system of claim 1, wherein:
  the catalytic converter includes a diesel oxidation catalyst (DOC).

* * * * *